LOW DISTORTION MAGNETIC RECORDER

Filed Oct. 21, 1963

INVENTOR.
WALTER J. SCHLATTER
BY S.C. Yeaton
ATTORNEY

United States Patent Office 3,345,468
Patented Oct. 3, 1967

3,345,468
LOW DISTORTION MAGNETIC RECORDER
Walter J. Schlatter, West Hempstead, N.Y., assignor to Sperry Rand Corporation, Great Neck, N.Y., a corporation of Delaware
Filed Oct. 21, 1963, Ser. No. 317,560
6 Claims. (Cl. 179—100.2)

ABSTRACT OF THE DISCLOSURE

The input circuit of an audio frequency magnetic recorder contains a summing network into which the signal to be recorded, an alternating current bias signal, and a feedback signal are coupled. The sum signal is amplified and applied to the recording head. The feedback signal, representative of the total instantaneous load current is circulated through the feedback loop.

This invention relates to magnetic recording devices and more particularly to high fidelity magnetic recording devices.

Many magnetic recording devices, and particularly audio frequency tape recorders, typically employ an alternating current bias in the order of 50–150 kc. in order to improve the linearity of the system.

Although this biasing scheme contributes to a high degree of fidelity, the use of alternating current bias requires additional components that add to the cost and complexity of the device.

Furthermore, although this biasing scheme reduces the amount of distortion that would otherwise be present in such a magnetic recorder, a significant amount of distortion still remains in practical systems.

This remaining distortion is particularly noticeable when equipment is operated at low tape speeds.

It is an object of the present invention to provide a magnetic recording device that will produce an output signal with exceptionally low distortion.

It is another object of the invention to provide a magnetic recording device that will produce an output signal with exceptionally high signal-to-noise ratios.

Yet another object of the invention is to provide a magnetic recording system with simplified alternating current biasing.

These and other objects are accomplished according to the principles of the invention by effectively including the magnetic recording medium in a negative feedback loop and by circulating the bias signal as well as the audio signal through this feedback loop.

The principles and operation of the invention may be understood by referring to the following description and the accompanying drawings.

The prior art discloses a magnetic recording device that employs a high quality negative feedback amplifier driving a magnetic recording head. The negative feedback voltage is developed across a resistor in series with the recording head and used to reduce distortion in the audio signal according to well-known principles. The alternating current bias is applied directly to the recording head winding, and a filter is inserted in the feedback loop to keep this bias signal from the amplifier.

Figure 1:
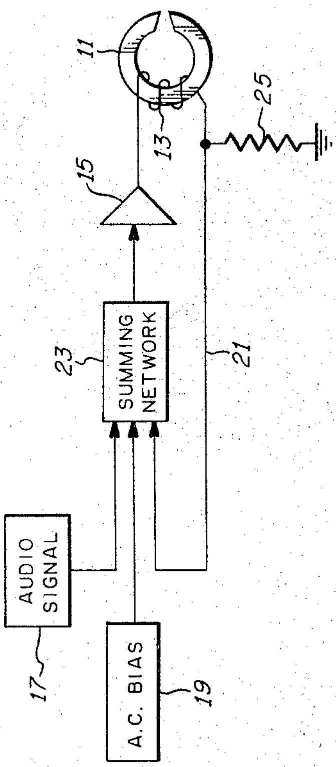
FIG. 1 is a block diagram of a device employing the invention.

Consider now the block diagram of FIG. 1 which represents a recording device constructed according to the present invention.

In this system a recording head 11 is driven through a coil 13 from an amplifier 15. Audio signals from a conventional audio signal source 17 are mixed with signals from an alternating current bias source 19 and a signal from a negative feedback loop 21 in a summing network 23. The negative feedback signals entering the loop 21 are developed across a feedback resistor 25. During normal operation, alternating current bias signals as well as audio signals are supplied to the amplifier through the summing network. The resultant current flowing through the coil 13 establishes a magnetic field in the recording head. This current also flows through the resistor 25 establishing a feedback voltage that is a function of the instantaneous alternating current bias and the instantaneous audio signal.

In this circuit, it will be noticed that the alternating current bias is applied to a summing circuit at the input of the amplifier rather than directly to the recording head.

In the previously mentioned prior art circuit in which the bias voltage is applied directly to the recording head, a filter must be employed in the feedback line between the feedback resistor and the summing circuit. This filter is necessary to prevent the alternating current bias signal from passing through the amplifier since such a signal would return to the recording head in phase opposition to the directly applied bias signal. If the filter were not used in this circuit, the bias voltage would act as any other spurious signal or distortion component not present in the input so that the signal from the feedback loop would effectively cancel the signal applied directly to the recording head from the bias oscillator. Since critical adjustment of the net bias signal applied to the recording medium is necessary to provide the desired linearity, this cancellation would make precise adjustment impossible.

In the circuit of the present invention, the negative feedback is applied to the bias signal as well as to the audio signal. This assures that the bias signal actually applied to the recording medium will be a faithful reproduction of the sine wave generated by the bias oscillator. The magnitude of the bias signal can be readily adjusted. Since the bias signal passes through the high gain amplifier, the bias oscillator is effectively isolated from impedance changes occurring in the recording head. Thus the same amplifier that is used to drive the recording head also serves as a buffer amplifier to preserve the quality of the sine wave generated by the bias source.

The circuit of the present invention obviates the need for the bias filter employed in the feedback loop of the previously mentioned prior art circuit.

Since the alternating current bias signal as well as the audio signal circulates in the feedback loop, any change in the load which would otherwise disturb the bias signal is cancelled by the negative feedback circuit.

A further advantage of the present invention arises from the fact that magnetic recording heads also function as playback heads. During normal operation with a ring-type head, for instance, a signal is recorded on the magnetic recording medium near the leading edge of the air gap. As that section of the recording medium continues on through the air gap, the moving remanent field induces a counter EMF in the recording head winding. This counter EMF varies exactly as the signal actually recorded on the recording medium. Thus the counter EMF not only contains components that are proportional to the signal applied to the recording medium, but also contains components proportional to the distortion and noise caused by the recording medium itself. These distortion and noise components are of significant magnitude in a practical magnetic recording device.

In the circuit of the invention, the recording head is included in the feedback loop. Because of the counter EMF developed by the moving magnetic medium, the medium itself is also effectively in the feedback loop. Because the medium is effectively in the feedback loop, any distortion and noise components arising in the medium itself are cancelled by the negative feedback action. A relatively high percentage of feedback and a high gain amplifier can be used in this circuit so that a substantially pure signal is finally recorded.

In the prior art circuit employing an alternating current bias directly connected to the recording head, the bias voltage must be prevented from reaching the amplifier input by inserting a filter in the feedback line. Thus distortion and noise components arising because of the alternating current bias signal or because of spurious signals in the frequency range of the alternating current bias signal will still appear in the recorded signal. Substantially all of the bias signal must be prevented from reaching the amplifier input in this prior art circuit. Since practical filters cannot completely block an undesired signal, the magnitude of the feedback voltage must be kept to a relatively low level if the amplifier is to be effectively isolated from the alternating current bias signal.

These factors, in turn, limit the amount of gain in the amplifier and the percentage feedback that can be tolerated so that the signal finally recorded contains significant noise and distortion products.

Figure 2:
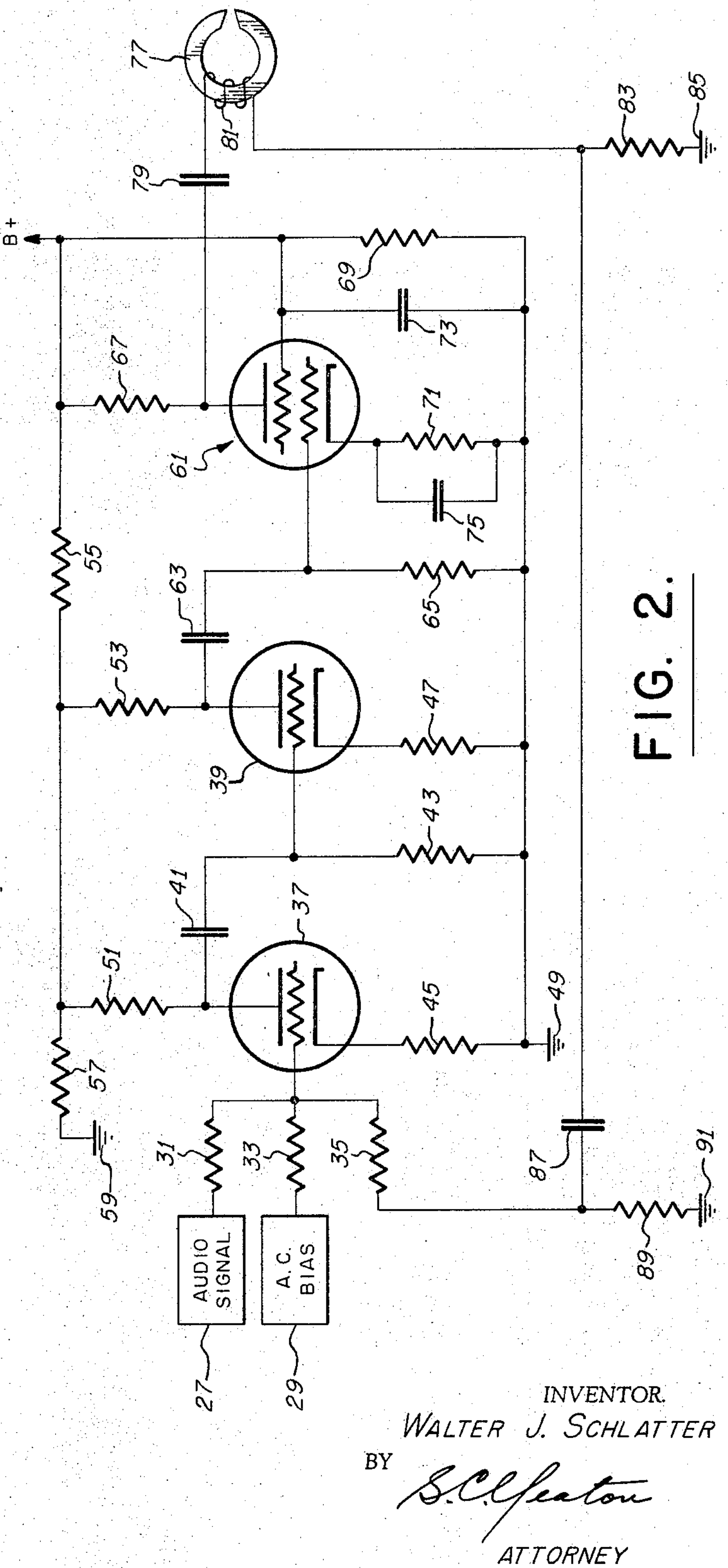
FIG. 2 is a circuit diagram of a presently preferred embodiment of the invention.

FIG. 2 represents a presently preferred circuit employing the invention. An audio signal to be recorded is derived from a suitably equalized audio signal source 27. An alternating current bias is derived from a source 29. These two signals are combined with the negative feedback signal in a summing network including the resistors 31, 33, and 35. The output of the summing network is applied to the grid of an input tube 37 where it is amplified and applied to the grid of a second amplifier tube 39 through a coupling network consisting of the coupling capacitor 41 and the grid resistor 43. The cathode resistors 45 and 47 and the grid resistor 43 are returned to a common ground 49. Plate current flows to the tubes 37 and 39 through the plate resistors 51 and 53 respectively. The voltage applied to these resistors is dropped to a suitable level which is determined by the relative magnitudes of the series dropping resistor 55 and the resistor 57. The resistor 57 is connected to a convenient ground point 59. These two tubes together with their ancillary components constitute a wide band, high-gain amplifier which drives an output stage 61 through a coupling network consisting of a coupling capacitor 63 and a grid resistor 65. A plate resistor 67 in the output stage is connected directly to the source of B+ voltage. The screen resistor 69 and the cathode resistor 71 in the output stage are bypassed by the capacitors 73 and 75 respectively. The various bypass and coupling capacitors are selected to provide wide band operation according to known design techniques. The amplifier output is coupled to the recording head 77 through the coupling capacitor 79. Current from the recording head winding 81 passes through a feedback resistor 83 to a ground point 85.

Feedback voltage, developed across the feedback resistor 83, is applied to the summing network through a blocking capacitor 87. This capacitor is made sufficiently large to cause negligible phase shift with any signal that is to be encountered. A damping resistor 89, connected to a ground point 91, serves to discharge the capacitor 87 and thus prevent spurious low frequency oscillation. The feedback network comprising the blocking capacitor and the associated resistors has a time constant sufficiently long to pass all of the desired audio frequencies and the alternating current bias signals with substantially uniform attenuation.

It will be appreciated that although the preceding description has been largely restricted to magnetic tape recorders, the principles of the invention may be applied to any type of magnetic recording medium. The amplifiers which have been described may be replaced by other suitable amplifiers capable of providing the necessary gain and negative feedback voltage points if so desired.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In a magnetic recorder, an amplifier; a summing network connected to the input of said amplifier; a magnectic recording head connected to receive the output signals from said amplifier; negative feedback means connected to conduct a voltage proportional to the total instantaneous current through said recording head back to the input of said summing network; a constant frequency alternating current bias source connected to the input of said summing network; and a source of audio signals to be recorded also connected to said summing network.

2. In a magnetic recorder, an amplifier; a magnetic recording head driven by said amplifier; signal combining means to provide an input signal to said amplifier that is the algebraic sum of several individual signals; means to provide a negative feedback signal proportional to the total instantaneous current in said recording head; biasing means to produce a constant frequency alternating current bias signal; and audio signal means to provide an audio signal to be recorded, said feedback means, said biasing means, and said audio signal means being connected directly to the input of said signal combining means.

3. A magnetic recording device comprising magnetizing means to apply a magnetic field to a magnetic recording medium; amplifying means to increase the magnitude of the signal to be recorded to a level suitable to drive said magnetizing means; biasing means to provide a constant frequency alternating current bias signal, said bias signal having a frequency higher than any audio frequency component to be recorded; summing means to provide a combination input voltage to the amplifying means that is the sum of several input signals; and feedback means to provide a negative feedback signal that is indicative of the instantaneous magnitude of the recorded signal, said summing means being connected to receive signals to be recorded, the input of said summing means further being connected directly to said biasing means and to said feedback means.

4. A magnetic recording device comprising an electronic amplifier having an odd number of stages; a ring type magnetic recording head capacitively coupled to the output stage of the amplifier; a feedback resistor connected between the recording head and ground; a summing network connected to the input terminal of the amplifier; a source of audio signals; a source of alternating current bias signals, said bias signals having a constant amplitude and frequency; and a feedback signal network connected to the ungrounded side of said feedback resistor, said source of audio signal, said source of bias signals, and said feedback network each being connected to individual input terminals of the summing network.

5. A magnetic recording device comprising a vacuum tube amplifier having an odd number of stages; a ring type magnetic recording head capacitively coupled to the output stage of the amplifier; a feedback resistor connected between the recording head and ground; a summing network connected to the input terminal of the amplifier; a source of audio signals connected to said summing network; a source of constant frequency alternating current bias signals connected directly to the input of said summing network; a blocking capacitor connected between the ungrounded side of said feedback resistor and said summing network; and the input of a damping resistor connected between the junction of said blocking capacitor and the input of said summing network and ground, said blocking capacitor having a capacity sufficiently large to pass said audio signals and said alternating current bias signals with substantially uniform attenuation.

6. A magnetic recording device comprising a vacuum tube amplifier having an odd number of stages; a ring type magnetic recording head; a recording winding on said head capacitively coupled to the output stage of the amplifier; a feedback resistor connected between said recording winding and ground; a summing network connected to the input terminal of the amplifier; a source of audio signals connected to said summing network; a source of constant frequency alternating current bias signals connected directly to the input of said summing network; and a feedback network connected between the ungrounded side of said feedback resistor and the input of the summing network, said feedback network comprising a blocking capacitor connected directly between said feedback resistor and the input of said summing network, and a damping resistor connected between the input of the summing network and ground, said feedback network having a time constant longer than the period of the lowest frequency to be recorded.

References Cited

UNITED STATES PATENTS

| | | | |
|---|---|---|---|
| 3,084,224 | 4/1963 | Sanford | 179—100.2 |
| 3,134,080 | 5/1964 | Story | 330—102 |
| 3,231,728 | 1/1966 | Kusto. | |

BERNARD KONICK, *Primary Examiner.*

L. G. KURLAND, *Assistant Examiner.*